3,242,179
PERIMIDONE-6,7-DICARBOXYLIC IMIDES, THEIR PRODUCTION AND USE AS PIGMENT DYES
Otto Christmann, Ludwigshafen (Rhine), Germany, and Werner Deuschel, Fribourg, Switzerland, assignors to Badische Anilin- & Soda-Fabrik Aktiengesellschaft, Ludwigshafen (Rhine), Germany
No Drawing. Filed Oct. 10, 1963, Ser. No. 315,345
Claims priority, application Germany, Oct. 12, 1962, B 69,202
11 Claims. (Cl. 260—256.4)

The present invention relates to perimidone-6,7-dicarboxylic imides, a hitherto unknown class of compounds having the general formula:

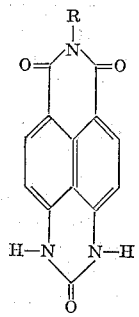

in which R denotes a hydrogen atom, an aliphatic radical or an aromatic radical.

These compounds, by reason of their outstanding fastness, are eminently suitable as pigment dyes.

When R denotes an aliphatic radical, those having one to six carbon atoms are preferred, particularly the methyl, ethyl, propyl and butyl radicals. The aliphatic hydrocarbon radicals themselves may bear substituents, for example, hydroxyl groups. When R denotes an aromatic radical, those are preferred having one ring, i.e., the phenyl radical, and two rings, including the naphthyl radical. The aromatic radicals themselves may also bear substituents, for example, halogen atoms.

The new compounds may be obtained by subjecting a 4,5-diaminonaphthalic acid derivative having the general formula:

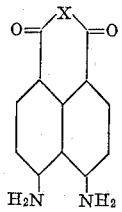

in which X denotes an oxygen atom or the grouping $$-\underset{\underset{R}{|}}{N}-$$

in which R denotes a hydrogen atom or a lower aliphatic or aromatic radical, to a conventional treatment by which the two amino groups are directly joined by a carbonyl group and, in the case where X denotes oxygen, the latter is replaced by the group $$-\underset{\underset{R}{|}}{N}-$$

during or after the introduction of the carbonyl group.

The steps in the reaction may be represented for example as follows:

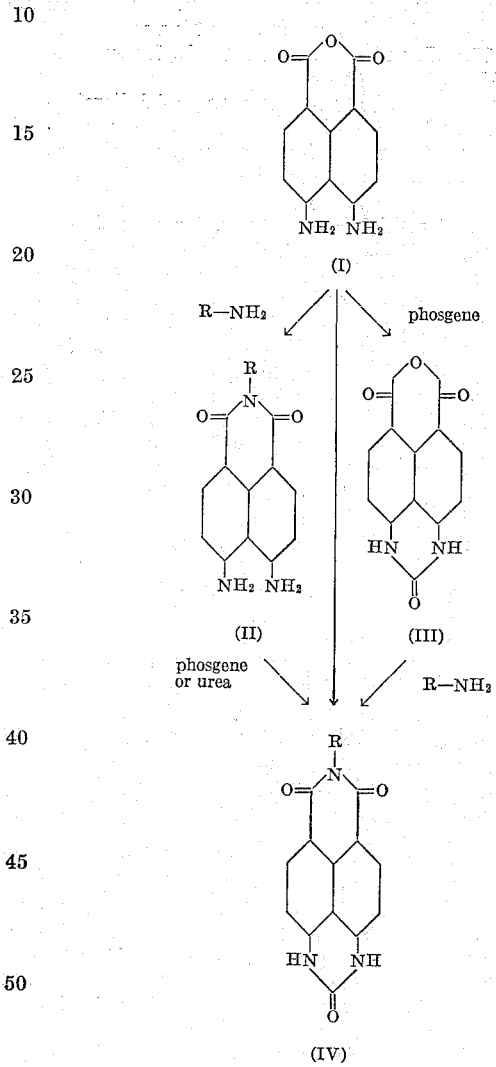

R=H, aliphatic radical or aryl radical

To prepare the new compounds, for example, 4,5-diamino-naphthalic anhydride (I) may be reacted in solvents with phosgene to form perimidone-6,7-dicarboxylic anhydride (III) and this may then be converted with ammonia or a primary amine into the corresponding perimidone-6,7-dicarboxylic imide (IV). High-boiling aromatic compounds, such as nitrobenzene, dichlorobenzene, trichlorobenzene, naphthalene, alkylnaphthalenes, chloronaphthalenes or mixtures of these compounds are particularly suitable as solvents. It is advantageous to introduce the Compound I into the solvent and then to allow phosgene to flow in at 50° to 250° C. Instead of the naphthalic anhydride, the naphthalic acid may also be introduced into the reaction medium because even at low temperatures it is converted into the anhydride. To prepare perimidone-6,7-dicarboxylic imide (Formula IV with R denoting hydrogen) from perimidone-6,7-dicarboxylic anhydride, the latter is dissolved for example at temperatures below 30° C. in aqueous ammonia and the solution heated to temperatures above 40° C. The perimidone-6,7-dicarboxylic imide (IV) thus separates out in a state of very fine division.

Perimidone-6,7-dicarboxylic imide (IV) may also be obtained in an excellent yield directly from 4,5-diaminonaphthalic anhydride (I) by reaction in a urea melt. At temperatures between 100° and 160° C., the reaction proceeds almost quantitatively, and the formation of the imide takes place at the same time as the carboxylation. The cooled melt is advantageously extracted with water. Perimidone-6,7-dicarboxylic imide (IV) remains as an insoluble residue. Reaction in a urea melt is also possible at less than 100° C. and more than 160° C., for example at between 80° and 200° C.

It is also possible however first to prepare 4,5-diaminonaphthalic imides (II) from 4,5-diaminonaphthalic anhydride (I) and ammonia or primary amines, and then to convert the imides (II) into perimidone-6,7-dicarboxylic imides (IV) by reaction with phosgene. Formamide may also be used at high temperatures, for example between 100° and 195° C., instead of ammonia or amines.

In the production of perimidone-6,7-dicarboxylic N-alkyl-imides from perimidone-6,7-dicarboxylic anhydride (III) and an alkylamine, it often contributes to the achievement of excellent yields if the reactions are carried out in anhydrous media. Particularly favorable results are achieved with nitrobenzene as the solvent, but above all with acid amides, such as dimethyl-formamide, N-methylpyrrolidone and similar polar solvents. If the aliphatic amine used for the reaction has a sufficiently high boiling point, or if the process is carried out in a closed vessel, the reaction may also be carried out without further solvent provided an excess of the aliphatic amine is present.

Very mild conditions are in general sufficient for the reaction of perimidone-6,7-dicarboxylic anhydride (III) with ammonia and aliphatic amines, but arylamines require considerably more stringent reaction conditions, for example, quinoline as the solvent, zinc chloride as condensing agent and temperatures of about 200° C.

Compound I may be obtained, for example, by reduction of 4,5-dinitronaphthalic anhydride, and the Compound II may be obtained not only from Compound I but also by reduction of 4,5-dinitronaphthalic imide which may be substituted on the imide nitrogen. Particularly diaminonaphthalic imides bearing aryl radicals as substituents on the imide nitrogen are advantageously prepared by reduction of the corresponding dinitronaphthalic imides. The dinitro imides may be reduced catalytically or by means of iron and hyrochloric acid in the presence of an organic solvent.

Particularly preferred compounds according to this invention, by reason of their industrial accessibility, include those having the general Formula IV in which R denotes H, $CH_3$, $C_2H_5$, $C_3H_7$, $C_4H_9$, $C_6H_5$ (phenyl) or $C_{10}H_7$ (naphthyl).

The perimidone-6,7-dicarboxylic imides according to this invention are yellow to greenish yellow compounds which in appropriately purified and finely divided form are valuable pigment dyes. Particularly advantageous means of effecting fine division are sulfate precipitation, wet and dry salt grinding and swelling in solvents, such as aromatic compounds, glycol ethers, alcohols, esters, ketones and above all in acid amides such as dimethylformamide or N-methylpyrrolidone. Swelling is in general carried out at temperatures of between 20° and 250° C., preferably at 100° to 210° C. The medium used for swelling may also contain emulsifying agents and dispersing agents. Fine division is often attended by a change in shade of the compound obtained by the synthesis.

If the perimidone-6,7-dicarboxylic imides are to be used as pigments it is desirable that they should have a mean particle size of 0.05 to 20 microns, preferably 0.1 to 2 microns. The pigments are extremely stable to dilute acids and weak alkalies, have excellent light fastness (especially when R is hydrogen or contains less than three carbon atoms), solvent resistance and thermostability and have outstanding color strength and brilliance.

The new pigments dyes may be used in pastes, flushing pastes, formulations, printing inks, distempers, binder colors and varnish paints of all kinds. The pigments may be contained in synthetic or natural macromolecular substances, such as polyvinyl chloride, polystyrene, polyamide, polyethylene, polypropylene, polyesters, phenoplasts, aminoplasts and rubber. The pigments may also be used for the mass dyeing of fibers of acetyl cellulose, polyacrylonitrile, polyesters, polyurethanes and polyvinyl chloride. They are also suitable for the mass dyeing of paper or for coloring inorganic substances, such as cement.

In all these materials the new pigment dyes give mainly yellow, full dyeings of excellent fastness to external influences, such as light, temperature and weathering.

The invention is further illustrated by the following examples. The parts given in the examples are parts by weight.

*Example 1*

23 parts of 4,5-diaminonaphthalic anhydride is dissolved in 4500 parts of nitrobenzene at 150° C. The solution is cooled to 100° C. and a stream of dry phosgene is passed in for thirty minutes at this temperature, then for thirty minutes each at 130° C., 160° C. and 190° C. The product is then flushed with nitrogen, cooled, filtered off with suction and the yellow residue washed with a little methanol. The yield is 21 parts (83% of the theory) of perimidone-6,7-dicarboxylic anhydride in the form of yellow crystals of high color strength. Melting point higher than 350° C.

20 parts of perimidone-6,7-dicarboxylic anhydride is dissolved at room temperature in 1500 parts of 5% ammonia. The solution is heated to gentle boiling within an hour. After another two hours the whole is cooled and the product filtered off with suction and dried. The yield is 18.1 parts (90.5% of the theory) of perimidone-6,7-dicarboxylic imide as an olive yellow powder having a melting point above 350° C. Reaction of perimidone-6,7-dicarboxylic anhydride with aqueous ammonia may also be carried out at high concentrations in heterogeneous phase, or it may be carried out with liquid or gaseous ammonia in an autoclave.

4,5-diaminonaphthalic anhydride may be prepared for example according to J. Honda and M. Okazaki, J. Soc. Org. Synthetic Chem. (Japan), 7, 25–9 (1950), and Chem. Abs., 47 6922b.

*Example 2*

5.1 parts of perimidone-6,7-dicarboxylic anhydride is dissolved cold in 150 parts of 10% aqueous methylamine solution and the solution heated to gentle boiling within an hour. The whole is cooled after another thirty minutes and the product filtered off with suction and dried. The yield is 4.3 parts (81% of the theory) of perimidone-6,7-dicarboxylic N-methylimide as a yellow powder having a melting point above 350° C.

Example 3

A mixture of 5.8 parts of 4,5-diaminonaphthalic anhydride and 58 parts of urea is heated to 150° C. within thirty minutes and stirred at 150° C. for two hours. The cooled melt is pulverized, water is added, the product filtered off with suction, washed with water and dried. The yield is 5.8 parts (100% of the theory) of perimidone-6,7-dicarboxylic imide.

For purification and fine dispersion, 7.9 parts of perimidone-6,7-dicarboxylic imide is dissolved in 120 parts of concentrated sulfuric acid, 40 parts of water is added to the solution, the precipitate formed is filtered off with suction and washed with 50 parts of 60% sulfuric acid. Ice and ammonia are added to the residue and it is washed with water and then with methanol. The yield is 6.8 parts (86% of the theory) of perimidone-6,7-dicarboxylic imide having a particle size of about 0.05 to 0.5 micron. 5.4 parts of the pigment thus obtained is heated under reflux in 80 parts of N-methylpyrrolidone to swell it, filtered off with suction at 50° C., washed with methanol and dried. The yield is 5.1 parts (94.5% of the theory) of perimidone-6,7-dicarboxylic imide having a particle size of 0.1 to 0.3 micron. It is an extremely brilliant yellow pigment having great color strength. It is particularly advantageous to use the paste still moist with methanol for swelling. Particle sizes of any desired magnitude may be prepared by longer swelling periods.

Example 4

300 parts of formamide which contains 23 parts of 4,5-diaminonaphthalic anhydride is boiled under reflux for two hours. The solution is then cooled, 1000 parts of water added, the product filtered off with suction and the residue washed with water and methanol. The yield is 23 parts (100% of the theory) of 4,5-diaminonaphthalic imide as a yellow-brown powder having a melting point above 350° C.

8.7 parts of 4,5-diaminonaphthalic imide is dissolved in 150 parts of nitrobenzene. A weak stream of phosgene is passed into the solution at 100° C. The temperature is raised to 160° C. within an hour and the whole stirred for another hour at 160° C. while continuing to pass in phosgene. The solution is then flushed with air, cooled, filtered off with suction and washed with methanol. The yield is 7.8 parts (80.5% of the theory) of perimidone-6,7-dicarboxylic imide.

For the purpose of purification and fine division, 10 parts of perimidone-6,7-dicarboxylic imide is ground in a vibratory mill with 100 parts of sodium chloride and 800 parts of porcelain balls for twenty-four hours. The sodium chloride is washed out with water and the product washed with methanol and dried. The yield is 9.8 parts (98% of the theory) of a yellow pigment having a particle size of 0.2 to 0.5 micron. By swelling this pigment with N-methylpyrrolidone, a yellow pigment having high color strength and high covering power can be obtained having a mean particle size of 1 micron.

Example 5

7.6 parts of perimidone-6,7-dicarboxylic anhydride is dissolved in 80 parts of N-methylpyrrolidone at 100° C. 5 parts of gaseous ethylamine is passed into the solution within one hour, the solution being heated to gentle boiling at the same time. The product is cooled, neutralized with 2N acetic acid, filtered off with suction, washed with water and methanol and dried. The yield is 7.4 parts (88% of the theory) of perimidone-6,7-dicarboxylic N-ethylamide as an olive yellow powder having a melting point above 350° C. Higher primary aliphatic amines, such as n-propylamine or n-butylamine, may be added to the reaction mixture in liquid form and also give a yield of 90% of the theory; the same is true of substituted alkylamines, such as ethanolamine.

Example 6

5 parts of 4,5-diaminonaphthalic N-phenylimide is mixed with 60 parts of urea and reacted as described in Example 3. The yield is 3.5 parts (64% of the theory) of perimidone-6,7-carboxylic N-phenylimide as a greenish yellow powder having a melting point above 350° C.

Example 7

20 parts of a yellow pigment prepared according to Example 3 or 4 and 20 parts of alumina trihydrate are ground in a three-roll mill with 60 parts of linseed oil varnish to form a printing ink in the usual way. When used for book printing or offset printing, the ink gives brilliant yellow prints having outstanding fastness properties, particularly very good light fastness and high color strength.

Example 8

5 parts of the pigment obtained according to Example 3 or 4 is ground in a ball mill with a nitrocellulose solution containing 10 parts of nitrocellulose, 5 parts of dibutyl phthalate, and 80 parts of a mixture (9:1) of ethanol and ethyl glycol. A yellow copper plate printing ink is obtained which is suitable for the production of prints which are resistant to light and solvents. By varying the formulation, printing pastes for other purposes may be obtained, for example, textile printing and screen printing pastes.

Example 9

8 parts of a pigment prepared according to Example 3 or 4 is ground in a stoving lacquer of 40 parts of coconut oil alkyd resin, 12 parts of urea-formaldehyde resin, 40 parts of xylene and 8 parts of n-butanol in a cone mill. Brilliant yellow lacquerings may be prepared with the product and after curing by stoving they are fast to weathering and overlacquering.

Example 10

A mixture of 70 parts of polyvinyl chloride, 30 parts of diisooctyl phthalate and 1 part of titanium dioxide (rutile type) is colored in a conventional manner with 0.5 part of a pigment obtained according to Example 3 or 4 in a mixing mill heated to 160° C. A greenish yellow plastics composition is obtained which may be used for example for the production of sheets or sections. The coloration is distinguished by outstanding fastness to plasticizers and light.

Example 11

100 parts of polystyrene granulate is mixed in a mixing drum with 1 part of a pigment obtained according to Example 3 or 4. The mixture is homogenized by means of a color extruder heated to 180° C. The strand issuing from the die of the extruder is broken up in a cutting machine and the resultant granulate processed into molded articles in an injection molding machine. Greenish yellow injection moldings are obtained having high fastness to light.

We claim:

1. The compound of the formula:

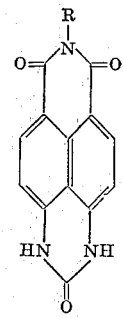

in which R denotes a member selected from the group consisting of hydrogen, alkyl of 1 to 6 carbon atoms, hydroxyalkyl of 1 to 6 carbon atoms, phenyl and naphthyl.

2. The compound of the formula:

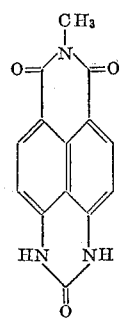

3. The compound of the formula:

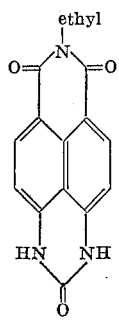

4. The compound of the formula:

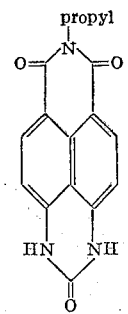

5. The compound of the formula:

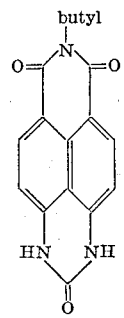

6. The compound of the formula:

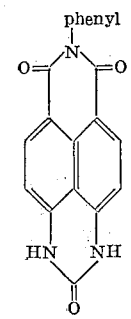

7. The compound of the formula:

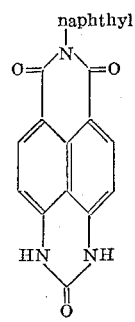

8. A process for the production of the compound:

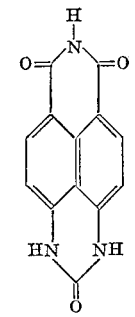

which process comprises fusing 4,5-diaminonaphthalic anhydride (I) with urea at a temperature between about 80° and 200° C.

9. A process as claimed in claim 8 wherein said temperature is between about 100° and 160° C.

10. A finely divided pigmented dye of the formula

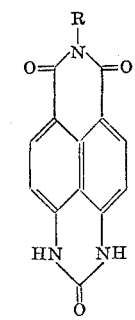

in which R denotes a member selected from the group consisting of hydrogen, alkyl of 1 to 6 carbon atoms, hydroxyalkyl of 1 to 6 carbon atoms, phenyl and naphthyl, the mean particle size of the pigmented dye being about 0.05 to 20 microns.

11. A pigmented dye as claimed in claim 10 wherein said mean particle size is about 0.1 to 2 microns.

References Cited by the Examiner

UNITED STATES PATENTS 2,961,438   11/1960   Fuchs et al. _____ 260—281

OTHER REFERENCES

Sachs, Annalen der Chemie, vol. 365, 1909, pages 135–137.

NICHOLAS S. RIZZO, *Primary Examiner.*

IRVING MARCUS, *Examiner.*